United States Patent [19]

Meershoek

[11] Patent Number: 5,347,196
[45] Date of Patent: Sep. 13, 1994

[54] LINE OUTPUT TRANSFORMER

[75] Inventor: Hans Meershoek, Chungli, Taiwan

[73] Assignee: U.S. Philips Corporation, New York, N.Y.

[21] Appl. No.: 32,344

[22] Filed: Mar. 16, 1993

[30] Foreign Application Priority Data

Mar. 19, 1992 [EP] European Pat. Off. ........ 92200784.4

[51] Int. Cl.$^5$ ............................................. H01J 29/06
[52] U.S. Cl. ............................................. 315/8; 315/278
[58] Field of Search ..................... 315/8, 241 R, 278

[56] References Cited

U.S. PATENT DOCUMENTS

| | | | |
|---|---|---|---|
| 2,858,478 | 10/1958 | Kershaw | 315/278 |
| 3,657,729 | 4/1972 | Hansen et al. | 315/8 |
| 3,798,493 | 3/1974 | Manske | 315/8 |
| 4,153,858 | 5/1979 | Schylander | 315/8 |
| 4,187,450 | 2/1980 | Chen | 315/278 |
| 4,262,232 | 4/1981 | Willis | 315/8 |
| 4,315,306 | 2/1982 | Tol et al. | 363/126 |
| 4,760,489 | 7/1988 | Truskalo | 315/8 |
| 4,902,942 | 2/1990 | El-Hamamsy | 315/278 |
| 4,950,959 | 8/1990 | Beckrot et al. | 315/278 |
| 5,122,947 | 6/1992 | Hishiki | 363/61 |

*Primary Examiner*—John T. Kwon
*Attorney, Agent, or Firm*—Bernard Franzblau

[57] ABSTRACT

A line output transformer with compensation for any alternating electric field in band 2, i.e., the horizontal deflection frequency band (AEF2). The output transformer comprises a ferromagnetic core with at least one leg and at least one high voltage winding arranged on a leg of the core and magnetically coupled to the core. A rectifier and a capacitor are coupled to the high voltage winding for generating a smoothed high DC voltage. A high voltage conductor is electrically connected to the rectifier and the capacitor for applying the high DC-voltage to an electrode of a cathode ray tube. In order to reduce the value of the AEF2, the high voltage conductor includes a first portion that is magnetically coupled to the core. Preferably, the first portion of the high voltage conductor includes at least one turn that surrounds a leg of the core.

11 Claims, 2 Drawing Sheets

LINE OUTPUT TRANSFORMER

BACKGROUND OF THE INVENTION

This invention relates to a line output transformer comprising a ferromagnetic core with at least one leg, at least one high voltage winding being arranged on a leg of the core and being magnetically coupled to the core, rectifier means and capacitor means being associated with the high voltage winding for generating a smoothed DC voltage, a high voltage conductor being electrically connected to the capacitor means for applying the said DC-voltage to an electrode of a cathode ray tube.

An example of a line output transformer is known from U.S. Pat. No. 4,315,306. The combination of the high voltage winding and the rectifier means (usually a number of semiconductor diodes) generates a high DC voltage (termed EHT) that is smoothed by the capacitor means and applied to the anode of a cathode ray tube. This cathode ray tube may be the picture tube of a television receiver or a monitor. For this type of equipment there are safety regulations that specify that certain electrical fields in the vicinity of the device may not exceed certain limits because such fields could be hazardous to the health of people using these devices. For example, the AEF2, which is the term used for the alternating electrical field in band 2 (the frequency band comprising the horizontal deflection frequencies) may not exceed 2.5 V/m at a distance of 0.5 m from the centre of the screen of the tube.

In general, all pans having an alternating voltage with a frequency in band 2 will contribute to the AEF2. The back and sides of a monitor can easily be shielded by means of a metal housing or an electrically conductive coating. It is more difficult to shield the front side of the picture tube because this side comprises a glass screen. The inner side of the cone and the inner side of the screen of the picture tube are electrically conductive and are connected to the anode contact to which the high voltage conductor of the line output transformer is to be connected. Ripple on the EHT is thus connected to the inside of the screen and therefore the screen acts as a generator for the AEF2 at the front side of the picture tube. It has been found that a ripple of 15–25 V on the EHT of about 20 kV will occur in current commercially available monitors. Depending on screen size, this ripple will cause an AEF2 value that exceeds the safety requirements. For example, on a 17 inch monochrome monitor a ripple of 21 V and an AEF2 value of 4 V/m has been found. The ripple is partly due to the internal stabilization of the EHT, but the major part is caused by capacitive coupling of the flyback pulse on the horizontal deflection coils to the inner coating of the picture tube. In principle it would be possible to reduce the AEF2 value by shielding the tube screen by means of an electrically conductive coating. Although such coatings are available, they are very expensive and not suitable for mass production. Therefore, it would be preferable to eliminate or reduce the cause of the AEF2. This could be achieved by providing an electrically conductive layer between the deflection unit and the tube. However, it is difficult to obtain a good electrical isolation between this layer and the horizontal deflection coils. Furthermore, this conductive layer must have a conductivity that is sufficient to perform its shielding function, but low enough to prevent excessive eddy currents. Because it is very difficult to meet all these requirements, this solution has not been used in practice.

SUMMARY OF THE INVENTION

It is therefore an object of the invention to provide a practical and inexpensive solution to the problem of reducing the AEF2 value in front of the screen of a picture tube that is to be connected to the high voltage conductor of the line output transformer. The line output transformer according to the invention is for this purpose characterized in that the high voltage conductor comprises a first portion that is magnetically coupled to the core.

The invention is based on the recognition of the fact that the value of the AEF2 can be reduced by adding opposite pulses to the EHT to compensate for the pulses induced by the deflection unit. Pulses of this type are induced in the first portion of the high voltage conductor, which, according to the invention, is magnetically coupled to the core of the line output transformer.

A preferred embodiment of the device according to the invention is characterized in that the first portion of the high voltage conductor comprises at least one turn that surrounds a leg of the core. Thus, the magnetic coupling of the first portion to the core is achieved by extremely simple means.

It is possible to obtain the magnetic coupling between the first portion of the high voltage conductor and the core by winding a portion of the high voltage cable around a leg of the core after completion of the manufacturing of an otherwise conventional line output transformer. It is, however, more elegant to incorporate the invention directly in the construction of the line output transformer. An embodiment in which this has been done, and which comprises a housing of an electrically insulating material, in which at least the high voltage winding, the rectifier means and the capacitor means are enclosed, is characterized in that the first portion of the high voltage conductor is also enclosed in the housing.

BRIEF DESCRIPTION OF THE DRAWINGS

These and other aspects of the invention will be described in greater detail with reference to the accompanying drawing, in which.

DESCRIPTION OF THE PREFERRED EMBODIMENTS

Figure 1:
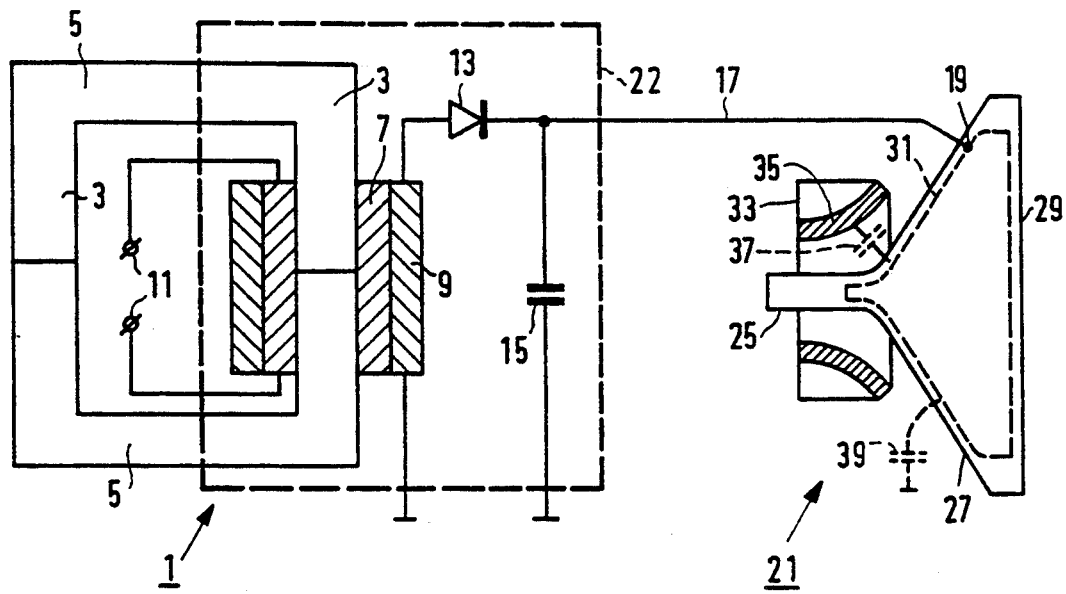
FIG. 1 is a schematic representation of a combination of a prior art line output transformer and a cathode ray tube.

The Figures only show those portions of the line output transformer and the cathode ray tube, that are important to understand the invention. FIG. 1 schematically shows a line output transformer 1 having a ferromagnetic core that is preferably manufactured from a suitable ferrite material. The core may comprise two U-shaped portions that have been assembled to form a closed core comprising two legs 3 connected by two yokes 5. A primary winding 7 and a secondary winding 9 are provided on one of the legs 3 (the leg on the right side in FIG. 1). These windings are shown only schematically, the associated coil formers and insulating layers being omitted in the drawing. The secondary winding 9 is a high voltage winding. Other windings (not shown) may also be provided on the legs 3. The primary winding 7 is connected to terminals 11 and the secondary winding 9 is connected to rectifier means 13 symbolized by a diode and to capacitor means 15. One end of the secondary winding 9 and one terminal of the capacitor means 15 is connected to ground. In operation a smoothed high DC voltage (EHT) is generated at the non-grounded terminal of the capacitor means, which is electrically connected to a high voltage conductor 17 having at its free end a high voltage connector (not shown) that is adapted to be connected to the anode contact 19 of a cathode ray tube 21. The windings 7 and 9, the rectifier means 13 and the capacitor means 15 may be enclosed in a housing 22 (shown in dotted lines) of an electrically insulating material. This housing may consist of a moulding compound cast around the said parts of the transformer 1. The tube 21, which may be a picture tube of a monitor, comprises a glass envelope that comprises a neck portion 25, a cone portion 27 and a screen 29. The inner sides of the cone 27 and the screen 29 have been made electrically conductive by the application of a conductive coating 31 indicated in dotted lines and this electrically conductive coating is connected to the anode contact 19. At the transition between the neck 25 and the cone 27 the tube 21 is surrounded by a deflection unit 33 that comprises, inter alia, line deflection coils 35. The line deflection coils 35 are capacitively coupled to the electrically conductive coating 31 as symbolized by means of the capacitor 37 shown in dotted lines. The coating 31 is also coupled to ground as symbolized by the capacitor 39 also shown in dotted lines.

Figure 2:
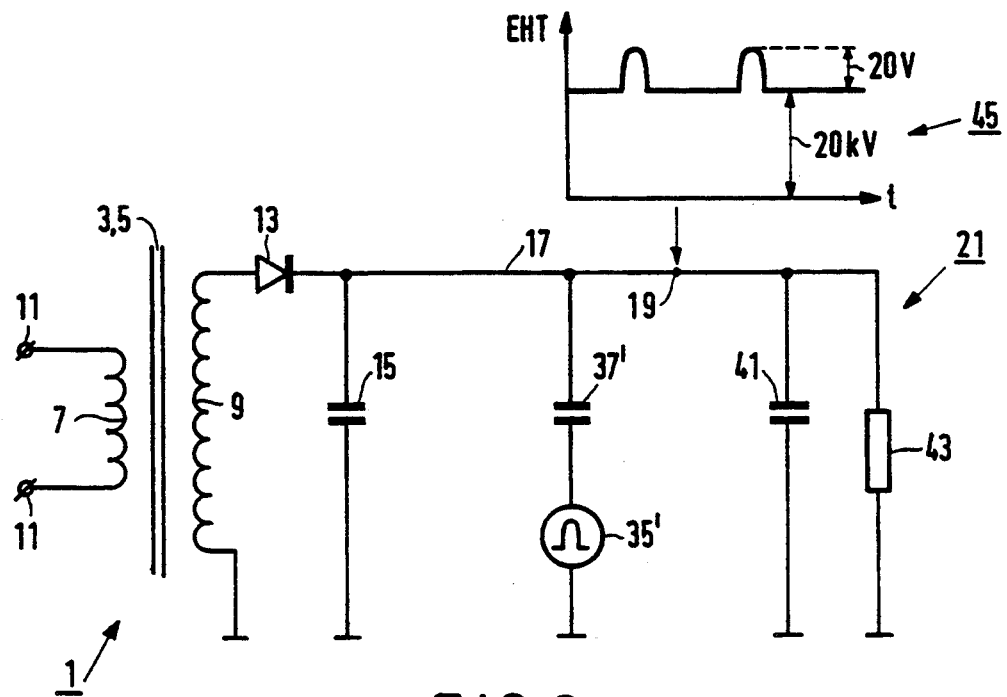
FIG. 2 is a circuit diagram showing the equivalent circuit of the combination shown in FIG. 1.

FIG. 2 is a circuit diagram showing the equivalent circuit of the combination shown in FIG. 1, the components of the circuit being indicated with the same reference numerals as the equivalent parts in FIG. 1. In FIG. 2 the cathode ray tube 21 is shown as a capacitor 41 and a resistor 43 connected in parallel between the anode contact 19 and ground. The line deflection coils 35 are equivalent to a voltage pulse generator 35' that generates pulses at the line deflection frequency and that is coupled to the anode contact 19 by means of a capacitor 37' which is the equivalent of the capacitive coupling 37 via the conductive coating 31. These pulses are superposed on the EHT that is applied to the anode contact 19, which cause a ripple of about 20 V on the EHT of about 20 kV as is shown in the voltage-time diagram 45. This ripple is responsible for generating an AEF2 having a value of several V/m in the vicinity of the screen 29, the conductive coating 31 acting as an antenna.

Figure 3:
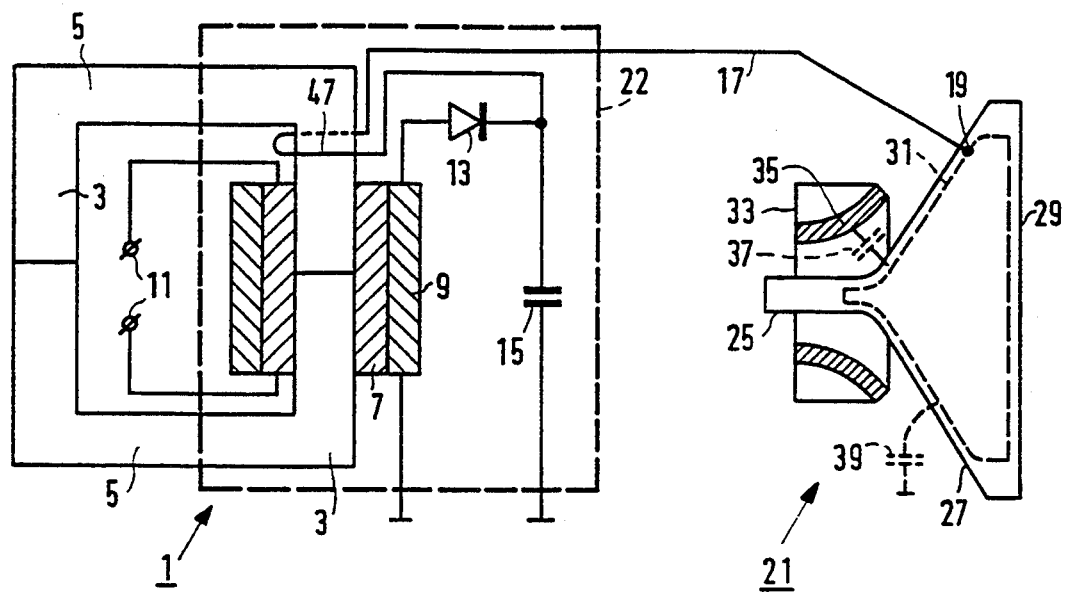
FIG. 3 is a schematic representation of a combination of an embodiment of a line output transformer according to the invention and a cathode ray tube.
Figure 4:
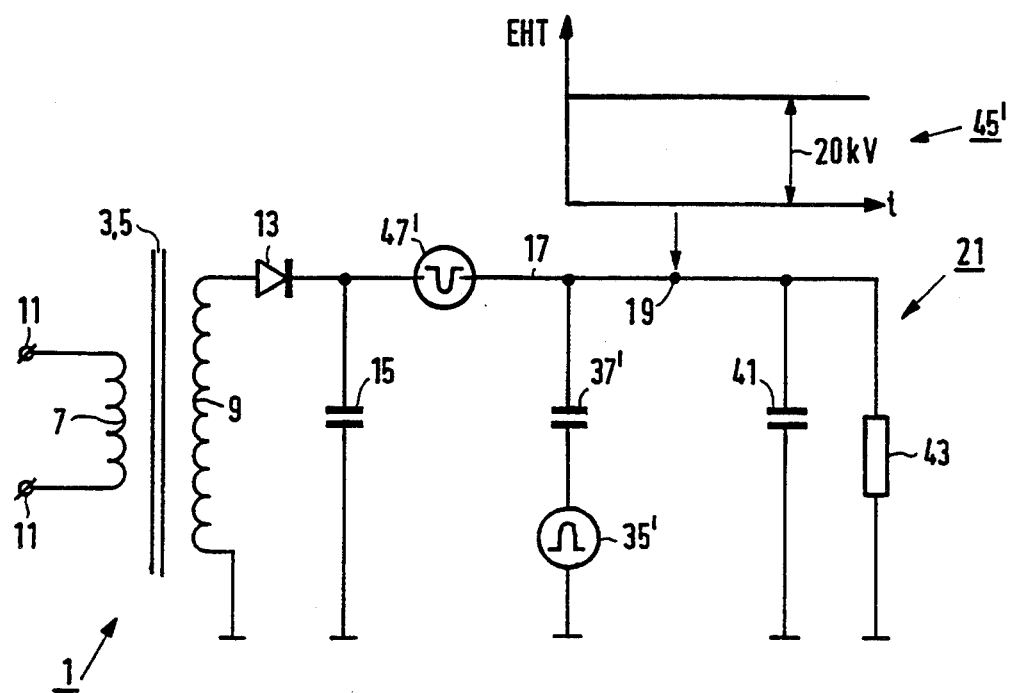
FIG. 4 is a circuit diagram showing the equivalent circuit of the combination shown in FIG. 3.

FIG. 3 shows a combination of a cathode ray tube and an embodiment of the line output transformer according to the invention, in which the value of the AEF2 has been substantially reduced, and FIG. 4 shows the equivalent circuit of this combination. As far as possible the same reference numerals as in FIGS. 1 and 2 have been used. In the embodiment shown in FIG. 3 the high voltage conductor 17 comprises a first portion 47 that is arranged in a single turn around the leg 3 of the core of the line output transformer on which also the windings 7 and 9 are arranged. Due to this arrangement the first portion 47 of the high voltage conductor 17 is magnetically coupled to the core 3,5 so that pulses having the line deflection frequency are induced in this portion. The winding sense of the first portion 47 around the leg 3 is chosen such that the polarity of these induced pulses is opposite to the polarity of the pulses induced in the conductive coating 31 by the line deflection coils 35. The first portion 47 thus acts as a voltage pulse generator 47' (FIG. 4) inserted in the high voltage conductor 17 and generating pulses that counteract the pulses generated by the generator 35'. The result of the introduction of the generator 47' is that the EHT is now substantially free of ripple as shown in the voltage-time diagram 45'. Consequently, the AEF2 value is significantly reduced. The arrangement has been tested in a 17 inch wide neck 110° monochrome monitor. Without corrective action the AEF2 value at a distance of 0.5 m in front of the centre of the screen 29 was 4 V/m and with the arrangement shown in FIG. 3 the AEF2 value was reduced to 1.5 V/m which is well below the admissible maximum value.

As is shown in FIG. 3, the first portion 47 of the high voltage conductor 17 is preferably enclosed in the electrically insulating housing 22. It is, however, also possible to arrange this first portion outside the housing 22, e.g. around the leg 3 that does not carry the high voltage winding 9 (the leg on the left side in FIG. 3). In that case, a line output transformer according to the invention could be manufactured by choosing the high voltage cable of an otherwise conventional line output transformer to be longer than usual, and arranging the excess length in one or more turns around the leg 3 that is not enclosed in the housing 22.

Other possible variations will be apparent to a person skilled in the art. For example, the capacitor means 15 may be a separate component that is accommodated outside the insulating housing 22. In that case, the first portion 47 of the high voltage conductor 17 could also be located outside the housing 22. Furthermore, it should be understood that the term high voltage conductor is not limited to a conductor that only carries a smoothed high voltage, but rather in the context of the invention described it should be interpreted in the usual sense of a conductor that carries any high voltage. The core 3,5 may have a shape that is different from the shape shown in FIGS. 1 and 3.

I claim:

1. A line output transformer comprising; a ferromagnetic core having at least one leg, at least one high voltage winding arranged on a leg of the core and being magnetically coupled to the core, rectifier means and capacitor means coupled to the high voltage winding for generating a smoothed DC voltage, a high voltage conductor electrically connected to the rectifier means for applying said DC-voltage to an electrode of a cathode ray tube, characterized in that the high voltage conductor comprises a first portion of said conductor that is magnetically coupled to the ferromagnetic core.

2. A line output transformer as claimed in claim 1, wherein the first portion of the high voltage conductor comprises at least one turn that surrounds a leg of the ferromagnetic core.

3. A line output transformer as claimed in claim 2, comprising a housing of an electrically insulating material, in which at least the high voltage winding, the rectifier means and the capacitor means are enclosed, wherein the first portion of the high voltage conductor is also enclosed in the housing.

4. A line output transformer as claimed in claim 1, comprising a housing of an electrically insulating material, in which at least the high voltage winding, the rectifier means and the capacitor means are enclosed, wherein the first portion of the high voltage conductor is also enclosed in the housing.

5. A line output transformer as claimed in claim 1, wherein said first portion of the high voltage conductor is electrically connected to an output terminal of said rectifier means.

6. A line output transformer as claimed in claim 2, wherein said one turn of the high voltage conductor is wound around said leg of the ferromagnetic core with a polarity such that high frequency pulses are induced therein of a polarity and amplitude so as to substantially compensate high frequency flyback pulses present on said high voltage conductor.

7. A line output transformer comprising:
a ferromagnetic core having at least one leg,
a primary winding and a high voltage winding arranged on said at least one leg and with the high voltage winding magnetically coupled to the ferromagnetic core,
a rectifier and a capacitor electrically coupled to the high voltage winding so as to generate a smoothed high DC voltage at an output of the rectifier, and
a high voltage conductor electrically connected to the output of the rectifier and to an electrode of a cathode ray tube so as to apply said high DC voltage to said cathode ray tube electrode, said high voltage conductor having a first conductor portion that is magnetically closely coupled to the ferromagnetic core of the line output transformer.

8. A line output transformer as claimed in claim 7, wherein said first conductor portion of the high voltage conductor comprises at least one turn thereof wound about a leg of the ferromagnetic core so as to induce in said high voltage conductor compensation pulses that oppose any high frequency flyback pulses present on said high voltage conductor.

9. A line output transformer as claimed in claim 7, wherein said first conductor portion of the high voltage conductor comprises at least one turn thereof wound about said one leg of the ferromagnetic core with a winding sense relative to said primary winding so as to induce in said high voltage conductor compensation pulses that oppose any high frequency flyback pulses present on said high voltage conductor.

10. A line output transformer as claimed in claim 7, wherein said first conductor portion of the high voltage conductor is connected to said output of the rectifier which in turn is connected to a first terminal of the capacitor, a second terminal of the capacitor being connected to a point of reference voltage.

11. A line output transformer as claimed in claim 7, wherein said first conductor portion of the high voltage conductor comprises at least one turn of the high voltage winding wound about a leg of the ferromagnetic core with a polarity so as to induce in said high voltage conductor compensation pulses that oppose any high frequency flyback pulses present on said high voltage conductor.

* * * * *